(12) United States Patent
Binney et al.

(10) Patent No.: US 9,563,205 B2
(45) Date of Patent: Feb. 7, 2017

(54) SENSOR CONFIGURATIONS AND METHODS FOR MOBILE ROBOT

(71) Applicant: Savioke Inc., Santa Clara, CA (US)

(72) Inventors: Jonathan Binney, Sunnyvale, CA (US); Chad Rockey, San Bruno, CA (US); Adrian Canoso, Menlo Park, CA (US)

(73) Assignee: Savioke, Inc., San Jose, CA (US)

( * ) Notice: Subject to any disclaimer, the term of this patent is extended or adjusted under 35 U.S.C. 154(b) by 0 days.

(21) Appl. No.: 14/618,720

(22) Filed: Feb. 10, 2015

(65) Prior Publication Data

US 2015/0253777 A1   Sep. 10, 2015

Related U.S. Application Data

(60) Provisional application No. 61/938,135, filed on Feb. 10, 2014, provisional application No. 61/944,524, filed on Feb. 25, 2015.

(51) Int. Cl.
*G05D 1/02* (2006.01)
*G06Q 50/28* (2012.01)
*G06Q 10/08* (2012.01)

(52) U.S. Cl.
CPC .......... *G05D 1/0214* (2013.01); *G05D 1/0246* (2013.01); *G06Q 10/08* (2013.01); *G06Q 50/28* (2013.01); *Y10S 901/01* (2013.01); *Y10S 901/47* (2013.01)

(58) Field of Classification Search
CPC .... Y10S 901/01; Y10S 901/47; G05D 1/0214; G05D 1/0246
See application file for complete search history.

(56) References Cited

U.S. PATENT DOCUMENTS

2013/0238121 A1* 9/2013 Davey ................ G06F 19/3456
700/245

* cited by examiner

*Primary Examiner* — Michael D Lang (57) ABSTRACT

A mobile robot can include an elongated body no more than two meters high and no more than one meter wide; at least one securable container; at least one depth sensor mounted near or at the top of the body to have a downward field of view (FOV), the at least one depth sensor comprising a video camera in combination with another distance sensor; and a drive mechanism configured to provide linear and rotational movement for the robot.

20 Claims, 8 Drawing Sheets

SENSOR CONFIGURATIONS AND METHODS FOR MOBILE ROBOT

CROSS-REFERENCE TO RELATED APPLICATIONS

This application claims the benefit of U.S. Provisional Patent Application Ser. No. 61/938,135 filed on Feb. 10, 2014 and Ser. No. 61/944,524 filed on Feb. 25, 2014, the contents all of which are incorporated by reference herein.

TECHNICAL FIELD

The present disclosure relates generally to mobile robots that can autonomously navigate within an environment, and more particular to sensor configurations and methods for such robots.

BACKGROUND

Mobile robots can rely on active sensors to detect their environment. Such sensors can be used to identify absolute or relative position, create maps through simultaneous localization and mapping (SLAM), and detect obstacles such as walls or movable objects. Obstacle detection is particularly important for avoiding unwanted collisions with moving vehicles, humans, animals, or even other robots. Such obstacle avoidance commonly relies on long-distance rangefinders that actively scan the environment using laser, infrared, or sonar beams. While such active range finding sensor systems can provide highly accurate centimeter scale position data on millisecond timescales, they can be relatively expensive. For example, laser-based sensors with a wide field of view (up to 270°) can sense stationary or moving obstacles up to 30 meters away by projecting a long-range laser beam and scanning it to bounce off any obstacles in order to detect the distance to the closest obstacle along that beam's path. This effectively delivers a view of obstacles in a 270° field of view around the sensor, and provides mapping and/or obstacle avoidance data that can be used by robot operating system software (ROS) such as provided by the Open Source Robotics Foundation.

Unfortunately, such conventional sensor arrangements can be costly and too delicate for many types of applications. Since sensor systems are a significant component in a robot bill of materials, providing low cost commercial robots depends at least in part upon use of low cost robot sensor systems that are effective, rugged, and simple to calibrate and assemble.

DETAILED DESCRIPTION

Embodiments can include robot sensor arrangements, robots having such sensors, and corresponding methods. In some embodiments, a robot can include one or more depth sensors with a low field of view (FOV) and/or that include an image sensor in combination with a signal emitter to sense objects/obstacles. Local detected objects/obstacles can be used to update a local map followed by the robot as it navigates to a destination location.

In some embodiments, depth sensor(s) can be mounted on the upper portion of a robot having a generally cylindrical or elongated shape. At least one such depth sensor can be mounted at a downward angle to scan a region that includes the area immediately in front of the robot (i.e., in its direction of movement). In a particular embodiment, a first depth sensor can be forward facing while another such depth sensor can be more downward facing as compared to the first sensor.

Figure 1A:
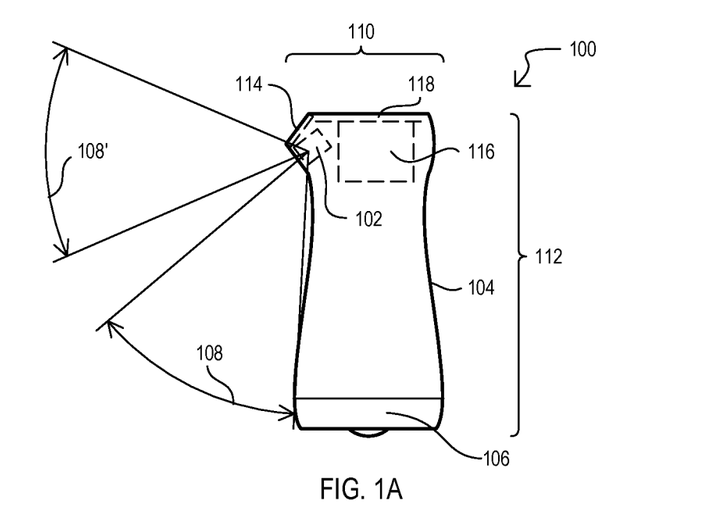
FIGS. 1A and 1B are side and top views of a robot according to an embodiment.
Figure 1B:
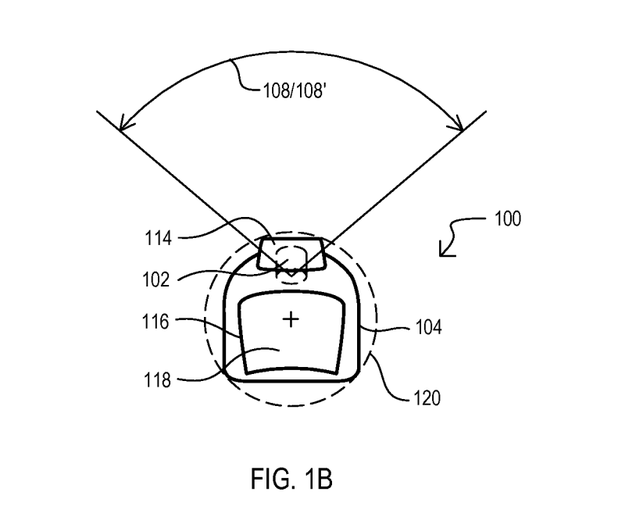
Figure 2A:
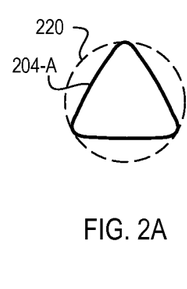
FIGS. 2A to 2D are series of top cross sectional views used to describe possible robot body shapes according to embodiments.
Figure 2B:
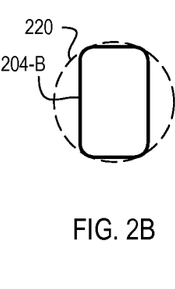
Figure 2C:
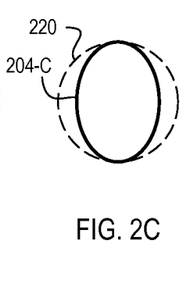
Figure 2D:
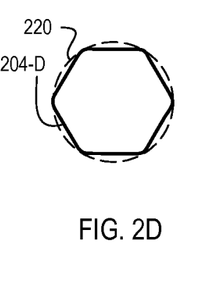

FIG. 1A is side view and FIG. 1B is a top view of a robot 100 according to an embodiment. A robot 100 can include one or more depth sensors 102, a body 104 and a movement system 106. A depth sensor 102 can be mounted on and/or within a robot body 104. A depth sensor 102 can have a relatively low field of view (FOV). A relatively low FOV can be less than 180° in one direction in some embodiments, less than 90° in one direction in particular embodiments, and less than 65° in one direction in very particular embodiments. As shown in FIG. 1A, a depth sensor 102 can be angled downward for a FOV 108 that encompasses the region immediately in front of the robot 100. In particular embodiments, a FOV 108 can include a portion of the robot 100 itself. In embodiments with multiple depth sensors 102, such depth sensors can have different FOV angles or the same FOV angles.

An addition or alternatively, a depth sensor 102 can have a relatively low FOV and be angled forward (with respect to robot forward movement) for a FOV 108' that encompasses the region forward of the robot 100. In some embodiments, a robot 100 can include one depth sensor 102 having one of the FOVs shown (108 or 108'). Alternatively, a robot 100 includes a depth sensor 102 capable of moving between multiple FOV orientations (e.g., between 108 and 108'). In other embodiments, a robot 100 can include multiple depth sensors 102, one of which provides a different FOV (e.g., one provides 108 and another provides FOV 108').

In some embodiments, a depth sensor 102 can operate by combining image capture with a beam emitter. In a particular embodiment, a depth sensor 102 can include an image sensor and an emitter that emits some spectra of light (e.g., any of infrared, visible or ultraviolet). The image sensor can detect objects by the emitted light reflected off the objects.

One or more depth sensors 102 can be fixedly mounted to a body 100. In such embodiments, to scan a region greater than a field of view, a robot 100 is capable of rotational movement to enable the fixed sensors to scan the environment. In other embodiments, one or more depth sensors 102 can be movably mounted to a body 100. In particular embodiments, such movable mountings can provide only limited movement for a depth sensor 102. In very particular embodiments, limited movement of depth sensor mountings can add no more than 45° to the depth sensor's existing FOV.

According to embodiments, a robot body 104 can have a generally cylindrical or elongated shape. A robot body 104 can have a height 112 that is greater than its width 110. In some embodiments, a height 112 can be no less than 1.5 times the width 110. Further, a robot body 104 can have a vertical size conducive to interaction with people. Accordingly, according to some embodiments, a robot height 112 can be between 0.8 to 2 meters, in particular embodiments, between 1.2 and 1.5 meters. In addition or alternatively, a robot 100 can have a width sufficient to store deliverable items, while at the same time being small enough to enable ease of movement in an environment. Accordingly, according to some embodiments, a robot diameter or maximum width can be less than a meter, in some embodiments between 30 and 60 cm, and in particular embodiments, between 40 and 50 cm.

A generally cylindrical/elongated body 104 can have a low profile surface when the robot 100 is in motion. That is, as a robot 100 moves, there can be no structures significantly projecting outward in a lateral direction. In some embodiments, a low profile body surface will have no structures extending away from the main body surface by more than ⅓ a width of the body, and in particular embodiments, not more than ¼ a width of the body. Such a generally cylindrical/elongated body can provide for more efficient movement in an environment, as a space occupied by a robot 100 can be essentially uniform in all lateral directions.

It is noted that in some embodiments, a robot 100 can maintain a low profile shape whether moving or stationary. However, in other embodiments, when a robot 100 is not moving, structures may extend outward from a body 104. As but one example, a robot 100 can include doors that swing away from a body 104 to enable access to a storage container and/or other locations interior to the body (e.g., maintenance access). Other embodiments, can have other deployable structure when the robot is not in motion.

According to embodiments, depth sensor(s) 102 can be mounted in a top portion of a body 104. In some embodiments, a top portion can be the upper ⅓ of the robot height 112. In particular embodiments, depth sensor(s) 102 can be mounted in a top 20% of the robot height 112.

A movement system 106 can include any suitable movement system that enables a robot 100 to move in its operating environment, including but not limited to wheeled systems, tracked systems, roller systems, or combinations thereof. In a particular embodiment, a movement system 106 can enable a robot 100 to have both linear and rotational movement. In one particular embodiment, a movement system 106 can include at least two wheels positioned apart from one another, each capable of independent rotation in either direction.

Referring still to FIGS. 1A and 1B, in some embodiments, a robot 100 can further include a user interface (I/F) 114. A user I/F 114 can enable a robot 100 to be directed or programmed to perform various tasks and/or to interact with other people. In a particular embodiment, a user I/F 114 can be a touch screen I/F for a low profile. According to particular embodiments, a robot 100 can be a delivery robot and a user I/F 114 can be used to authenticate delivery to an indicated destination and/or person.

Along these lines, a robot 100 can also include a container 116. A container 116 can be formed within a body 104, to maintain a low profile shape. In some embodiments, a container 116 can be securable, having some structure to limit access to stored contents. In a particular embodiment, a robot 100 can include a door/lid 118 for securing the container 116. A door/lid 118 may or may not be lockable.

According to embodiments, a robot can have generally cylindrical or elongated body. In some embodiments, such a shape can be one that maintains a generally closed curved shape in lateral cross section. Such a shape may vary according to vertical position, however. A generally cylindrical body does not require a circular or ellipsoid cross section. As shown in top view of FIG. 1B, a generally cylindrical body 104 has rounded features, but is not circular or ellipsoid. In some embodiments, a generally cylindrical body, when viewed in lateral cross section, can occupy a majority of the area of an inscribing circle or ellipse. Thus, as shown in FIG. 1B, a body 104 occupies a majority of an inscribing circle 120.

FIGS. 2A to 2D show various other cross sectional shapes that can be included in a generally cylindrical body. Each of FIGS. 2A to 2D shows a body 204-A to 204-D that occupies the majority of the area of an inscribing circle 220. The various body cross section shapes of FIGS. 2A to 2D are provide by way of example only, and should not be construed as limiting.

Having described a sensor configuration and corresponding robot according to various embodiments, methods of operation for a robot according to embodiments will now be described.

Figure 3:
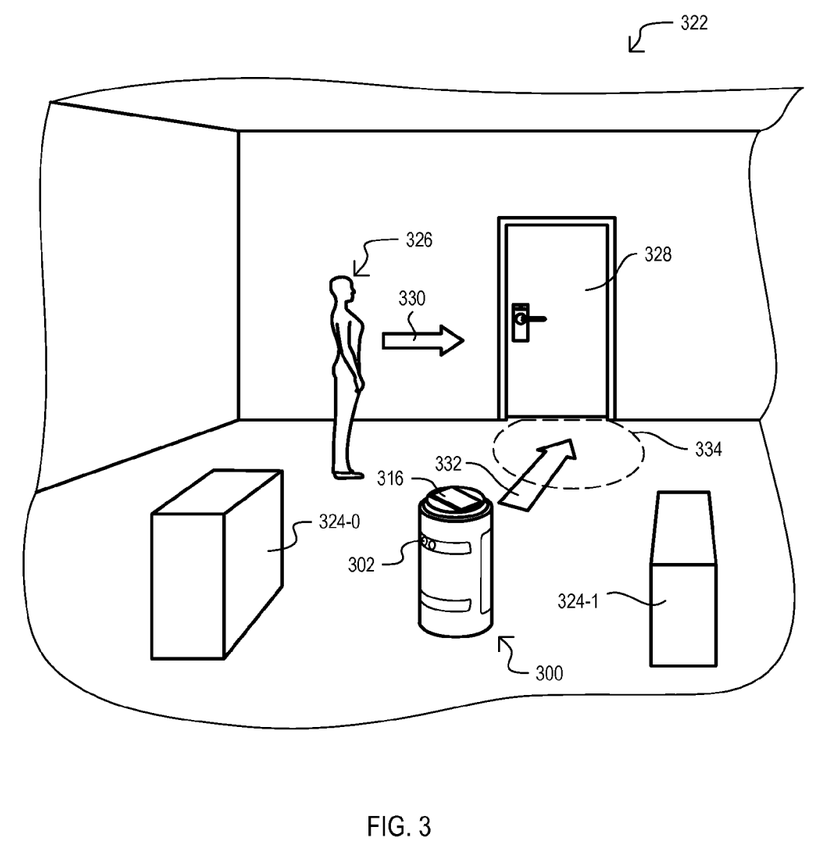
FIG. 3 is a cartoon illustrating a depth sensor mounted on a robot maneuvering in an environment.

As seen in the cartoon illustration of FIG. 3, a robot 300 can move in an environment 322 such as a hallway or room, even in the presence of potentially blocking objects or people moving through the area. In particular embodiments, a robot 300 can be any of those described herein, or equivalents. A robot 300 can be autonomously movable in an environment 322 that can include multiple fixed objects 324-0 and 324-1, as well as one or more movable object 326, such as person moving toward a door 328 in a direction indicated by arrow 330.

In addition to translational movement along a floor of the environment 322, robot 300 can rotate through 360°, permitting environment scanning with one or more sensors 302 fixedly mounted or having a limited movement. A sensor 302 can include at least one image based depth sensor. A robot 300 can move in a direction indicated by arrow 332 to a target destination zone 334 in front of the door 328. Upon reaching the target destination zone 328, deliveries held in a securable container 316, which, in the particular embodiment shown, can be built into a top of the robot 300. Deliveries within securable container 316 can be removed by a room occupant (not shown).

Sensor(s) 302 can be fixed or movably mounted near or at a top of the robot 300. In some embodiments, a key area to sense during obstacle avoidance can be the area directly in a movement path (e.g., 322) of the robot 300, particularly the area directly in front of the robot 300. Accordingly, in some embodiments, sensors 302 (including one or more depth sensors) can include one or more sensors that are directed generally downward or outward, with a field of view typically maintained to include an area into which the robot 300 is moving.

In some embodiments, sensor(s) 302 can include a depth camera that is mounted such that it points directly downward, with about half of its field of view filled with a body of robot 300 while the remaining half can be used for obstacle detection. In some embodiments, a depth sensor within sensors 302 can be mounted out and down at an angle of up to FV/2 from vertical to provide greater viewable area for obstacle detection.

In very particular embodiments, depth sensors can include components similar to, or derived from, video gaming technology, enabling three dimensional sensing. Such depth sensors can be more cost effective than wide FOV laser-based sensors employed in conventional systems. Very particular examples of possible sensors of this type can include, but are not limited to, the Kinect manufactured by Microsoft Corporation, Carmine by Primsense (now owned by Apple Computer), or DepthSense 325 by SoftKinetic. Such depth sensors can be more cost effective, and typically direct infrared light to bounce off objects and be captured by an image sensor in order to determine how far those objects are from the sensor; while further incorporating an video camera (such as an RGB video camera) to allow the depth image to be combined with the video image.

Compared to commonly available laser sensors, depth sensors included in a robot according to embodiments can have a much narrower field of view (typically less than 90°), a much shorter effective range of depth detection (around 1-3 meters), and often have a "dead zone" with limited or absent depth ranging within a half meter or so of the depth sensor.

According to some embodiments, mounting one or more depth sensors as described herein can overcome limitations associated with a typically narrow field of view and other limitations of such depth sensors. In certain embodiments, a depth sensor can be movable, with hinged, rail, hydraulic piston, or other suitable actuating mechanisms used to rotate, elevate, depress, oscillate, or laterally scan the depth sensor. In other embodiments, multiple depth sensors can be used and generally directed so that forward, backward, upward and downward regions are monitored. In certain embodiments, conventional RGB CMOS or CCD sensors can be used, alone or in combination with narrowband, wideband, polarization or other spectral filters. Embodiments can also include infrared, ultraviolet, or other imaging focal plane array devices to allow for hyperspectral image processing. This can allow, for example, monitoring and tracking of guides, markers, or pathways that are not visible, or not easily visible to people.

In some embodiments, ambient light such as sunlight, incandescent, halogen, LED, fluorescent or other commonly available artificial source may illuminate the environment in which a robot (e.g., 100, 300) moves, and depth sensors of the robot can use such light to detect objects/obstacles. In addition or alternatively, a robot can have one or more attached (movable or fixed) light sources to augment or serve as a light source for object/obstacle detection. Such light sources can augment ambient light intensity and/or provide wavelengths not available in the ambient light source and/or substitute for ambient light in dark environments.

If a robot (e.g., 100, 300) includes such light sources, the light sources may be mounted along with, or separately from, the depth sensors, and can include monochromatic or near monochromatic light sources such as lasers, light emitting diodes (LEDs), or organic light emitting diodes (OLEDs). In some embodiments, broadband light sources may be provided by multiple LEDs of varying wavelength (including infrared or ultraviolet LEDs), halogen lamps or other suitable conventional light source. Various light shields, lenses, mirrors, reflective surfaces, or other optics can provide wide light beams for area illumination or tightly focused beams for improved local illumination intensity.

Interaction with a robot (e.g., 100, 300) can be provided by local input or network interface. As but a few examples, local input can be through a touchpad, by voice or gesture control, or by dedicated remote controllers. Local display of status, functionality, and error messages or the like may be afforded by a touchpad display. The display can be a conventional LCD display, a bistable displays (such electronic paper or similar), an OLED display, or other suitable display. Local user input can include a robot mounted pad, hard or soft keyboard, touch sensitive element (which may be integrated as part of the optional display), or similar, to provide for user input, voice control, or camera mediated user gestural control.

In certain embodiments, a wired or wireless connect subsystem can be used to connect to another user interaction device such as a laptop, tablet, or smart phone (not shown). Optionally, data and control signals can be received, generated, or transported between varieties of external data sources, including wireless networks, personal area networks, cellular networks, the Internet, or cloud mediated data sources. In addition, a robot (e.g., 100, 300) may include a source of local data (e.g. a hard drive, solid state drive, flash memory, or any other suitable memory, including dynamic memory, such as SRAM or DRAM) that can allow for local data storage of user-specified preferences or protocols.

In one particular embodiment, multiple communication systems can be provided. For example, a robot (e.g., 100, 300) can be provided with a direct Wi-Fi connection (802.11b/g/n), as well as a separate 4G cell connection provided as a back-up communication channel (e.g., such as that included on an interface tablet computer). Similarly, tablet or robot mounted Bluetooth or other local communication systems can be used to identify pre-positioned radio beacons, or to form a part of a user interface via a user smartphone or tablet.

According to embodiments, when a robot (e.g., 100, 300) autonomously moves to conduct a task, it can rely on localization for tracking its current position. A typical example of localization technologies is a simultaneous localization and mapping (SLAM) technique. Thus, a mobile robot (e.g., 100, 300) can use SLAM to detect information of surroundings of a work space where the robot conducts a task and process the detected information to construct a map corresponding to the work space while at the same time estimating its absolute position.

In certain embodiments, Bluetooth beacons, radio beacons, light emitting devices, and/or visible patterns can be placed at particular sites or objects to assist robot navigation.

In some embodiments, a robot (e.g., 100, 300) can carry a wide range of amenities and supplies in various optional lockers, shipping containers, or shelving units, including food and beverages. Some of these supplies (especially beverages) may spill or be damaged if the robot does not move smoothly and gently. Such a problem can be especially acute when the robot starts and stops, particularly during emergency stops (e.g., when someone jumps into its path). In one embodiment the robot (e.g., 100, 300) can be controlled to gently accelerate and decelerate, minimizing the forces felt by the payload. To enable such a response, a robot (e.g., 100, 300) can have a motor control system of sufficient fidelity for smoothly decelerate multiple motors (wheels) simultaneously. In a particular embodiments, a robot (e.g., 100, 300 can include a high-frequency (e.g. 1000 Hz) motor control loop system.

Referring still to FIG. 3, in operation, a robot (e.g., 100, 300) can detect a movable object 326, and plan a new path to avoid the object, or slow down or halt until the object 326 is no longer in the desired movement path 332 of the robot (e.g., 100, 300). Stationary objects 324-0/1 can be avoided according to a local movement plan. Stationary objects 324-0/1 can already be known, and verified by location detection, or newly detected by the robot.

Figure 4:
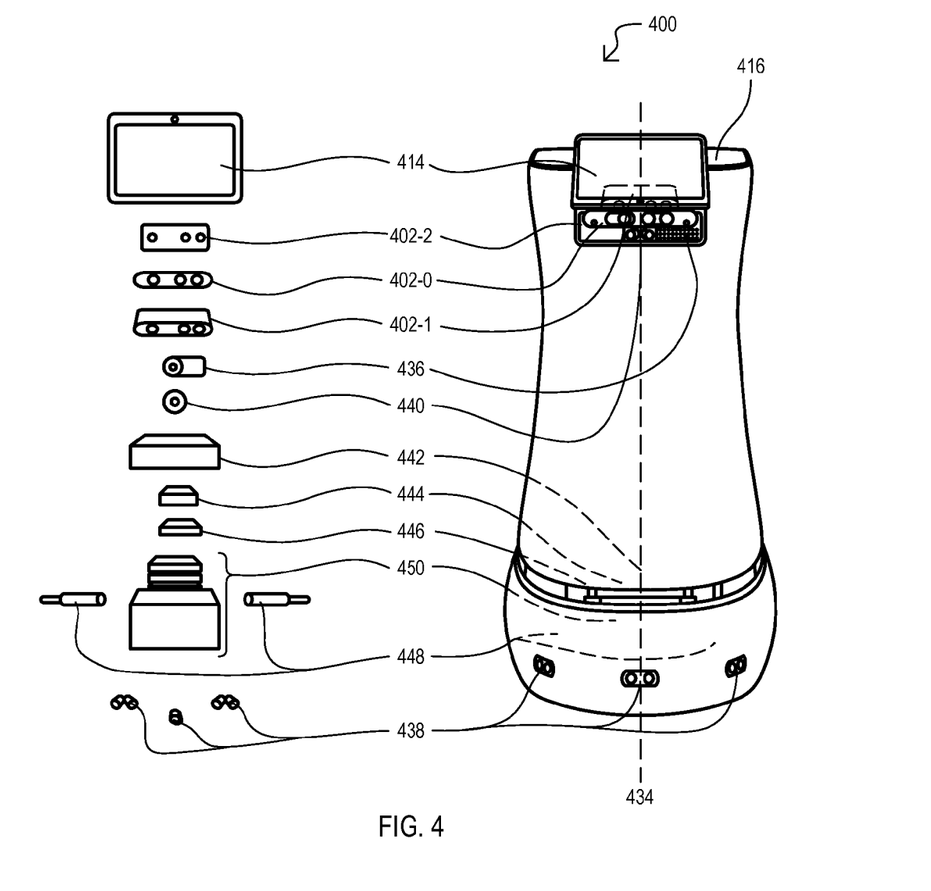
FIG. 4 is a diagram showing one example of a robot having multiple depth sensors mounted on a rotatable, generally cylindrical robot, according to an embodiment.

FIG. 4 shows a robot 400 according to one particular embodiment, as well as selected components of the robot 400 in an exploded view. In some embodiments, robot 400 can be one very particular implementation of robot 100 shown in FIG. 1 or robot 300 shown in FIG. 3.

A robot 400 can have a generally cylindrical shape about a vertical midline 434. Advantageously, this shape simplifies movement calculations and simplifies rotation in place, since position and potential interactions of objects with extending arms or the like do not have to be determined. A touch tablet computing device (tablet) 414 can be included for user input and/or messaging, and can be mounted at the top of the robot at an angle convenient for viewing and user input. In addition to a visible display, tablet 414 can be used for speech input/output, and/or for processing and controlling the robot 400.

In some embodiments, a speaker 436 separate from the tablet 414 can also be included for providing audible instructions or notices.

In some embodiments, a storage container 416 can be included within a body 404 of the robot, positioned behind the tablet 414. In some embodiments, storage container 416 is securable. In particular embodiments, storage container 416 is lockable, and can be controlled to unlock for delivery to a recipient only when a destination has been reached an authorization to unlock is received.

In the embodiment of FIG. 4, robot 400 can support multiple fixed depth sensors, including a forward looking depth sensor 402-0 and a downward looking depth sensor 402-1 mounted adjacent to each other. In the disclosed embodiment, the depth sensors (402-0/1) can be fixedly mounted in a manner that does not require a turret or movable actuators. In particular embodiments, each depth sensor 402-0/1 can include a beam emitting device and an image sensor that detects the beam as it reflects off of objects. In a very particular embodiment, depth sensors 402-0/1 can include an IR emitter and IR image sensor, such as an IR video camera. In some embodiments, a robot 400 can include a video camera 402-2 to provide additional imaging capabilities. In very particular embodiments, a video camera 402-2 can be an RGB CMOS type video camera.

In addition to depth sensors, a robot 400 can include one or more other sensors. Referring still to FIG. 4, a robot 400 can further include a base mounted sonar array 438 and a wide angle sonar 440 mounted near a top of the robot 400.

A robot 400 can be controlled by one or more processors executing stored instructions that can be responsive to sensor inputs and/or transmitted inputs. In a particular embodiment, an x86 or similar central processing unit 442 can be used in conjunctions with one or more microcontrollers 444 and motor controllers 446 for local control of movement of the robot 400.

In the embodiment shown, differential drive motors 448 powered by batteries 450 can provide movement by driving wheels (not shown) that support the robot 400. In particular embodiments, batteries 450 can be lithium ion or some other battery type, rechargeable battery systems being preferred. A drive mechanism includes separate drive motors 448 each attached to its own wheel, in a differential drive configuration. In some embodiments such a drive mechanism can allow for a robot velocity of 1.5 meters/second, and the ability to move up and down ramps, as well as on level ground. In a particular embodiments, a robot 400 can include two drive wheels between 4-8 inches in diameter, preferably about six inches in diameter.

According to embodiments, a robot 400 can be sized to have a height of between 0.8 to 2 meters, preferably between 1.2 to 1.5 meters, and a diameter of between 30-60 centimeters, preferably between 40-50 centimeters. Such physical dimensions can enable robot 400 to easily move through hallways and doorways.

Figure 5A:
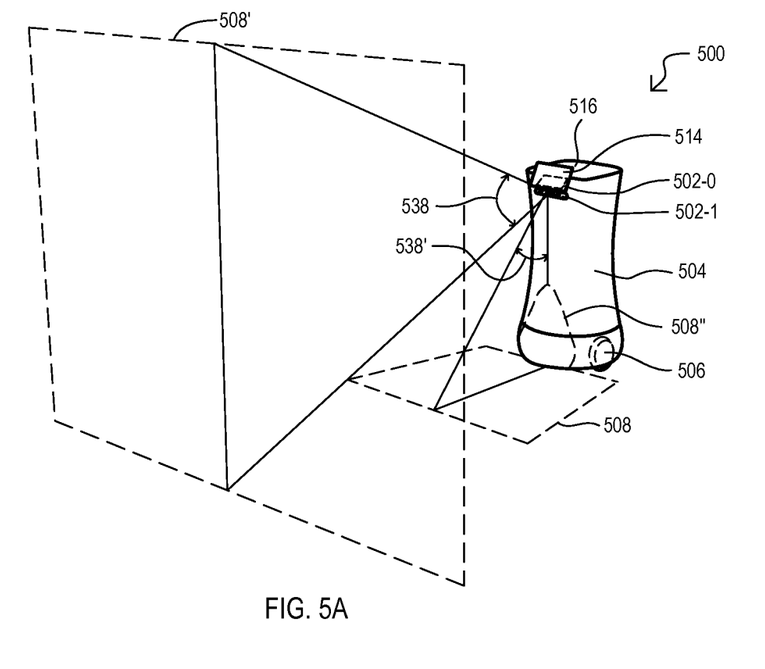
FIGS. 5A and 5B are diagrams showing fields of view for sensors of a robot according to embodiments.
Figure 5B:
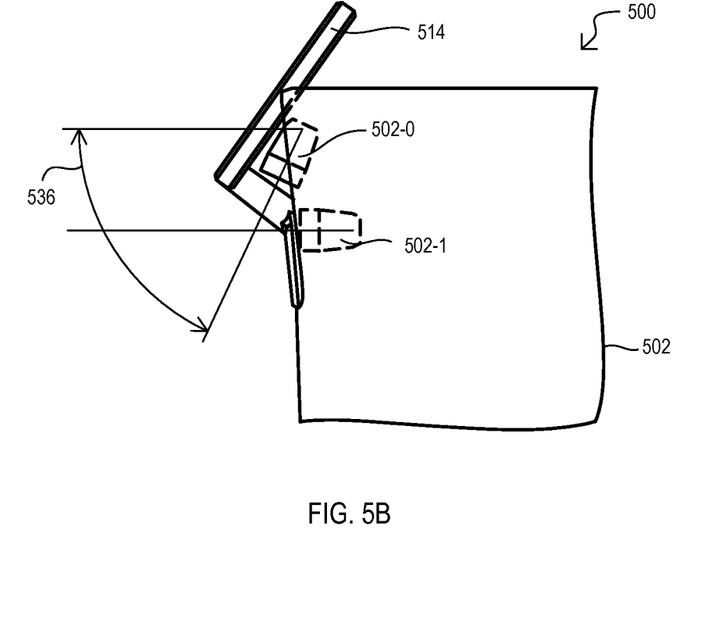

FIGS. 5A and 5B are diagrams showing depth sensing field of view configurations according to embodiments. Such field of view configurations can be included in any of the robots described herein.

FIG. 5A is a perspective view showing a robot 500 and two corresponding fields of view 508 and 508'. FIG. 5B is a side view showing a top portion of the robot 500. In the embodiment shown, a robot 500 can have two depth sensors 502-0/1 fixedly mounted near a top of the robot 500. Depth sensors 502-0/1 can be any suitable depth sensor, but in particular embodiments, can include an emitting device and image sensor as described herein, or an equivalent. In some embodiments, one or both depth sensors 502-0/1 can include an RGB CMOS type video camera. In the embodiment shown, depth sensors 502-0/1 can be positioned adjacent to each other. In some embodiments, depth sensors 502-0/1 can be within a few centimeters of one another. In some embodiments, both depth sensors 502-0/1 can produce color images with corresponding depth information. That is, both depth sensors 502-0/1 can include video cameras.

Depth sensors 502-0/1 can be mounted at the top of the robot 500 facing the forward traveling direction of the robot (i.e., the front). In one particular embodiment, depth sensors 502-0/1 can be mounted 80 cm to 85 cm above the floor. One depth sensor 502-1 can be pointed directly ahead, while the other depth sensor 502-0 can be angled downward to image the floor directly ahead of the robot. Such an angle is shown as 536 in FIG. 5B. In a very particular embodiment, such an angle can be between 50° and 80° in the vertical direction, preferably between 60° and 70°, and in one very particular implementation, about 65°. A vertical field of view angle for each depth sensor 502-0/1 is shown as 538 and 538' in FIG. 5A. In some embodiments, such field of view angles can be less than 180°, in other embodiments such angles can be less than 90°, and in further embodiments less than 60°. In one very particular embodiment, a field of view for each depth sensor 502-0/1 can be 57° in the horizontal direction and 45° in the vertical direction.

Referring still to FIG. 5A, in some embodiments, a near edge of the field of view 508 for a downward pointed depth sensor 502-0 can intersect a lower portion of the robot body 504 (i.e., the base). This is represented in FIG. 5A by the pear-shaped dashed line 508" on the front of the robot 500 that shows the edge of the field of view 508 as it intersects the curved body 504 of the robot 500. The trapezoid shape 508 on the floor in front of the robot shows the area visible to the downward facing depth sensor 502-0. The vertical trapezoid 508' in front of the robot 500 shows the area visible to the forward facing depth sensor 502-1.

The robot 500 of FIGS. 5A and 5B can also include a movement system 506, user I/F 516, or storage container 516 according to any of the embodiments described herein, or equivalents.

Figure 6:
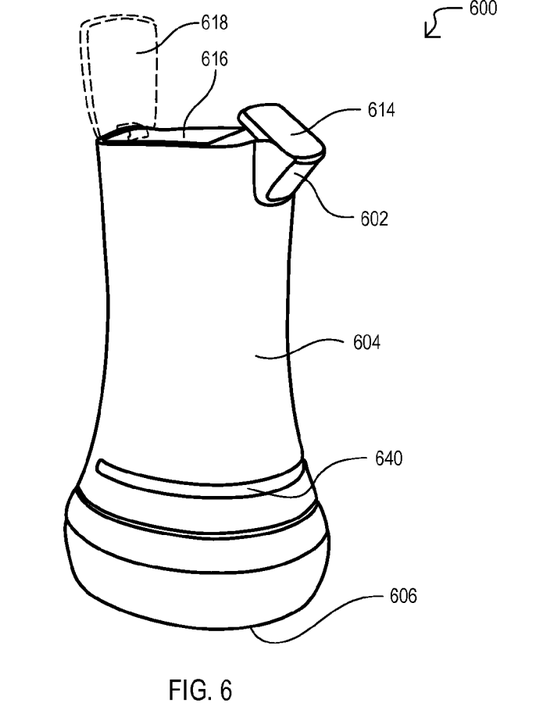
FIG. 6 is a perspective view of a robot according to one particular embodiment.

Referring to FIG. 6, a robot 600 according to a further embodiment is shown in a perspective view. A robot 600 can have a body 604 with a generally cylindrical or elongated shape. One or more depth sensors 602 can be mounted on an upper portion of the body 604 to enable downward and/or forward facing depth sensors. Depth sensors 602 can have any of the configurations and/or components described for embodiments herein, or equivalents. A robot 600 can include a user I/F 614 also mounted on an upper portion of body 614. In one embodiments, user I/F 614 can be a tablet computing device with a touchscreen. A robot 600 can include a storage container 616, which in the embodiment shown, can extend into a top surface of the robot body 604. In the embodiment shown, a storage container 616 can be securable, including a door/lid 618 which can be closed. In particular embodiments, door/lid 618 is lockable and can be unlocked and/or opened upon authentication in a delivery operation.

A robot 600 can include additional body mounted items 640, which can include, but are not limited to, lighting structures to provide notification lighting, lighting for use by sensors 602, or one or more additional sensors.

While various robots, robot sensor mounting arrangements, and related methods have been described above, additional methods will now be described with reference to a number of diagrams.

Figure 7:
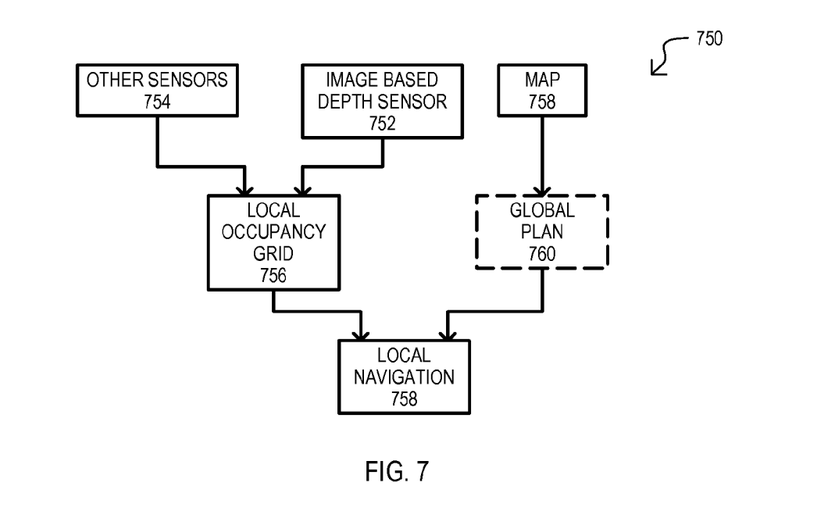
FIG. 7 is a flow diagram of a robot operation according to an embodiment.

FIG. 7 is a flow diagram of a method 750 according to an embodiment. A method 750 can include image sensor based depth sensors scanning for the presence of local objects/obstacles 752. Such actions can include one or more image based depth sensors mounted at or toward a top of a robot body that detect a beam emitted from the depth sensor, such as a light of a non-visible or visible spectrum. In very particular embodiments, such actions can include an infrared video camera operating in conjunction with an infrared emitter to determine the presence and distance of a local object/obstacle 752.

A method can also include additional sensors scanning for local objects and/or determining a local position of a robot (754). Based on data generated by blocks 752 and 754, a local occupancy grid can be derived 756. As but one example, upon detecting a new object/obstacle, a local occupancy grid can be updated to include the presence of the object/obstacle, as well as whether such an object/obstacle is in motion or stationary. A method 750 can also include a robot using map information 758 in conjunction with a local occupancy grid to create local navigation controls 758. In some embodiments, map information can also be used to create a global plan of navigation 760, prior to creating the local plan.

Figure 8:
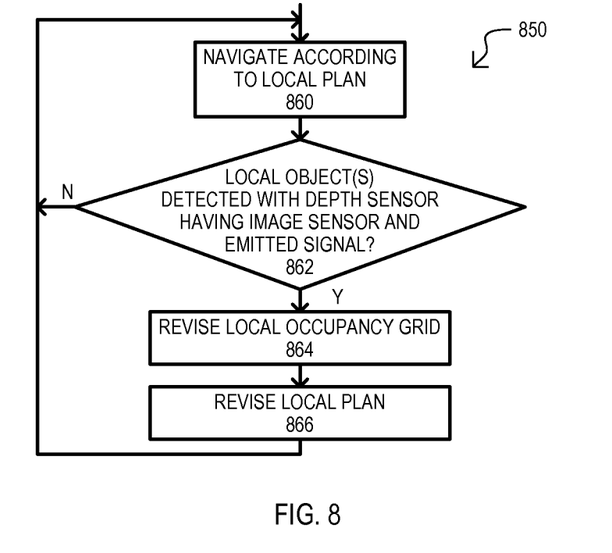
FIG. 8 is a flow diagram of a robot operation according to another embodiment.

FIG. 8 shows another method 850 according to an embodiment. A method 850 can include a robot navigating according to a local plan 860. A robot can use a sensor having an image sensor and emitted signal to detect local object(s)/obstacle(s) 862. If no local object/obstacle is detected (N from 862), a method 850 can return to navigating according to the local plan (860). If a local object/obstacle is detected (Y from 862), a method 850 can revise a local occupancy grid stored in the robot 864 that accounts for the detected object(s)/obstacle(s), and revise its local plan 866 accordingly. A method 800 can then return to navigating according to the local plan (860).

Figure 9:
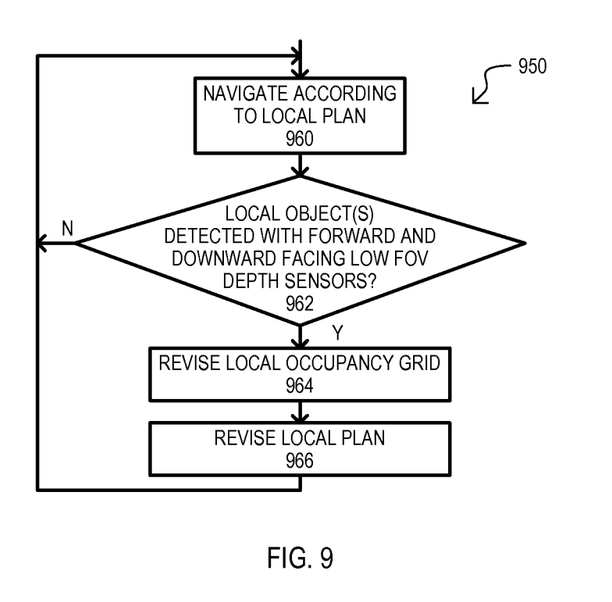
FIG. 9 is a flow diagram of a robot operation according to a further embodiment.

FIG. 9 shows another method 950 according to an embodiment. A method 950 can include actions like those of FIG. 8. Such like actions are referred to by the same reference character but with the leading digit being a "9" instead of an "8".

Method 950 differs from that of FIG. 8 in that action 962 can include a robot using forward and downward facing low field of view (FOV) depth sensors to detect local object(s)/obstacle(s) 962. A low FOV depth sensor can have a field of view less than 180° in some embodiments, less than 90° in other embodiments, and less than 60° in a particular embodiment.

Figure 10A:
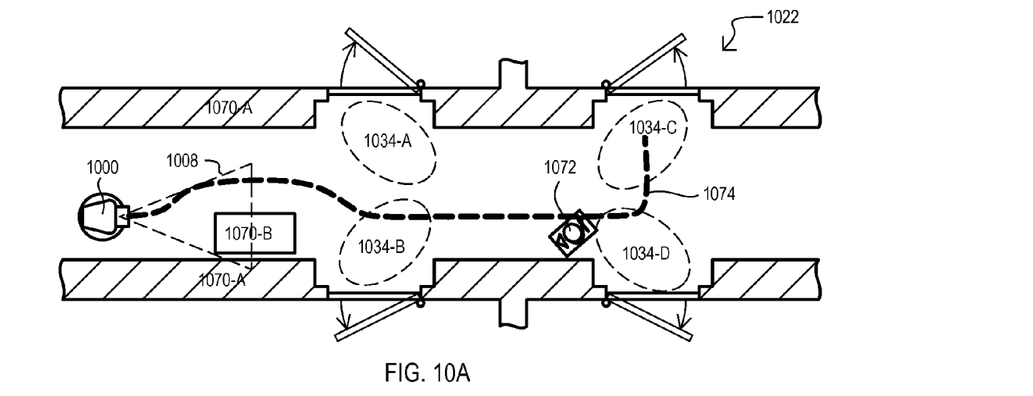
FIGS. 10A to 10C are a series of views showing robot operations according to an embodiment.
Figure 10B:
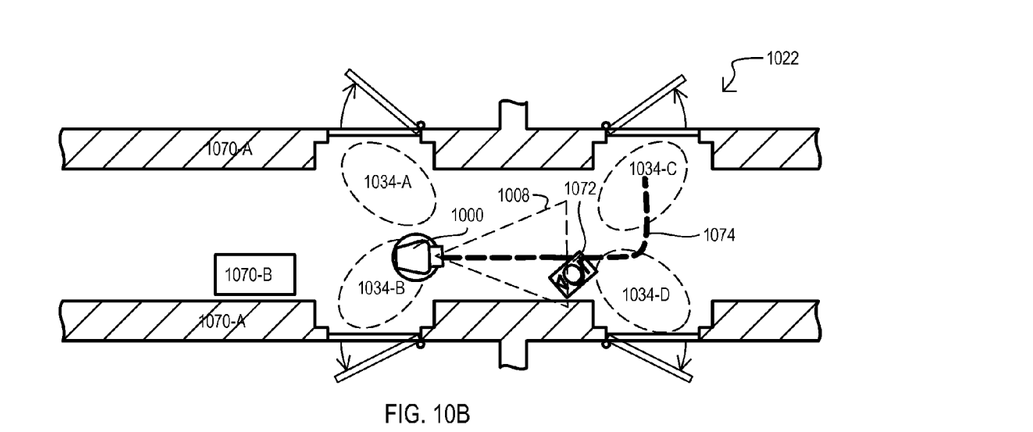
Figure 10C:
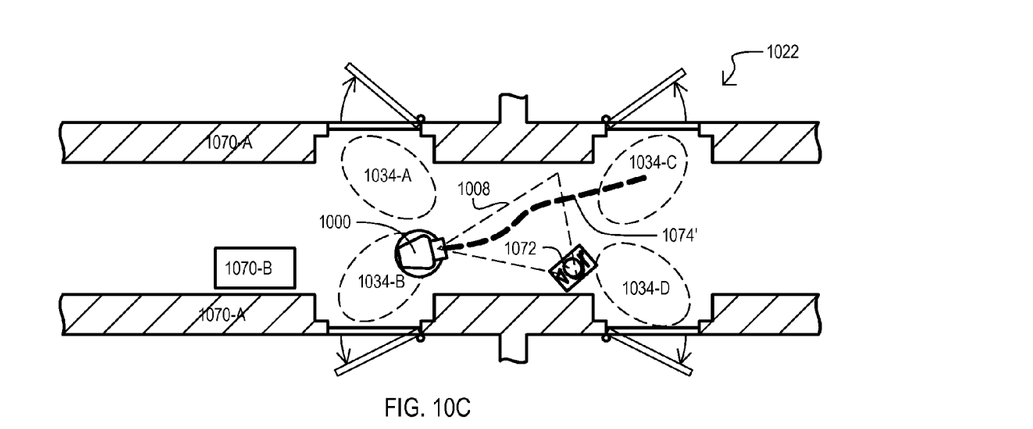

FIGS. 10A to 100 are a sequence of diagrams showing robot navigation according to a particular embodiment. FIGS. 10A to 100 show an environment 1022 (a hallway) that can include target destination zones (1034-A to 1034-D) (areas in front of doors). Environment limits or known objects are shown as 1070-A (walls) and 1070-B (known furniture). These features can be derived from map data, global occupancy grid, or local occupancy grid. A robot 1000 can follow a local plan 1074 derived from a local occupancy grid, map data, and global plan. Environment 1022 also includes a new object 1072. New object 1072 is not included or known from the map data, global plan or local plan.

In FIGS. 10A to 10C it is assumed that the robot 1000 is navigating to target destination 1034-C according to local plan 1074. Further a field of view for a sensor (or group of sensors) is shown as 1008. A robot 1000 and its corresponding sensor(s) can include any of those described herein, or equivalents.

Referring to FIG. 10A, a robot 1000 can move according to a local plan 1074, which takes into account the presence of known objects, which includes avoiding obstacle 1070-B.

Referring to FIG. 10B, as robot 1000 continues along local plan 1074 new object 1072 appears in its sensor(s) field of view 1008, and so is detected. Robot 1000 can update its local occupancy grid to include new object 1072.

Referring to FIG. 10C, based on the new local occupancy grid, robot 1000 can generate a new local plan 1074' that enables it to arrive at the target destination 1034-C, while at the same time avoiding the new object 1072.

Figure 11:
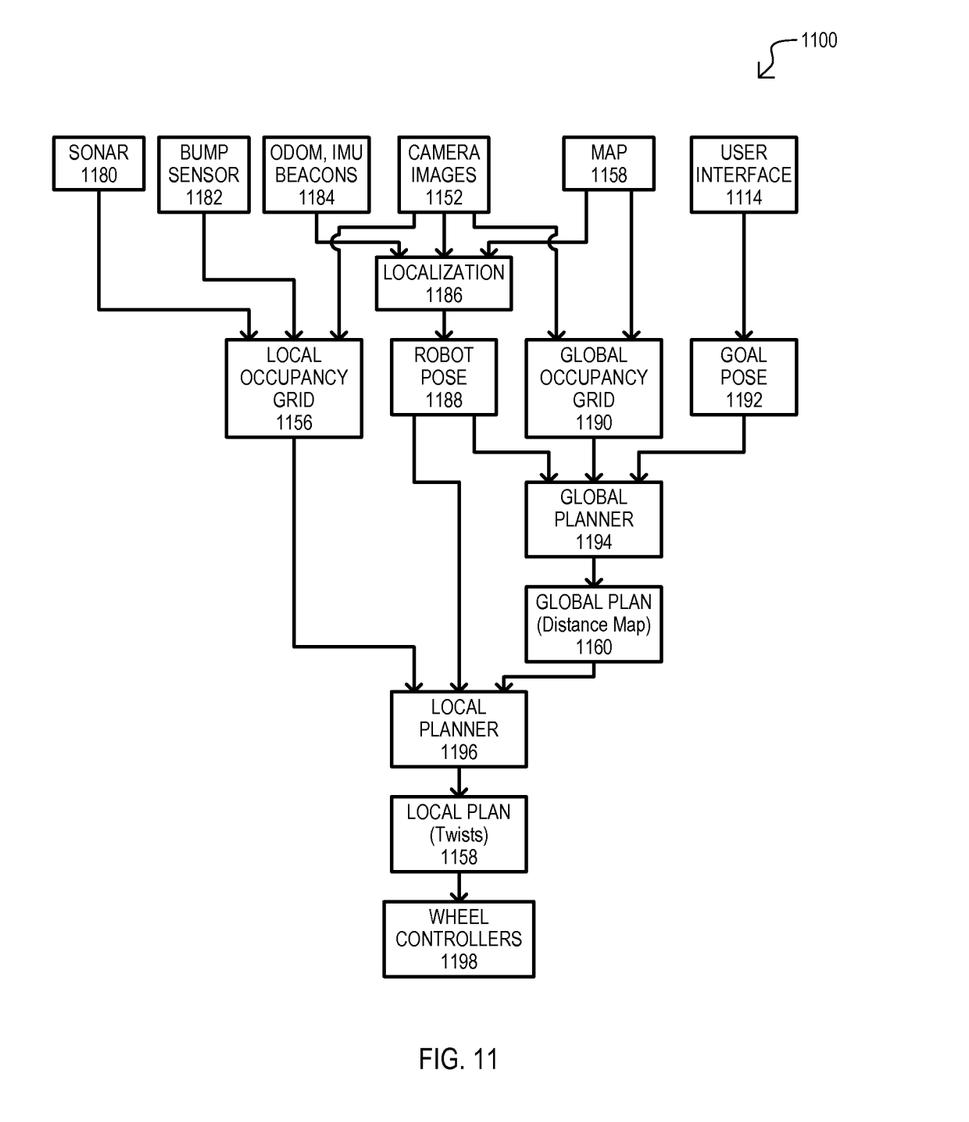
FIG. 11 is a flow diagram of a robot operation according to a particular embodiment.

FIG. 11 is a flow chart illustrating process steps for autonomous robot navigation according to an embodiment. In FIG. 11, a robot can navigate through an environment with variously positioned movable and non-movable items, as well as a target destination.

Referring to FIG. 11, a sensor suite of a robot can include one or more sonars 1180, one or more bump sensors 1182, and any of odometers, inertial measurement units (IMU), or other sensors configured to work with beacons, including beacons that emit light or radio signals (represented by 1184). A sensor suite can also include one or more camera systems 1152 capable providing video or multiple still images.

Sensor data from the camera images (1152) and/or odometers and position beacons (1184) can be used to localize a position of the robot 1186. In some embodiments, map data 1158 can also be used in localization (1186). Localization 1186 can be used to arrive at a robot pose 1188, which can include the robot's position and orientation in a local environment. In the embodiment shown, sensor data from the camera images (1152), sonar(s) 1180 and bump sensor(s) can provide local knowledge of object position in the environment around the robot (local occupancy grid) 1156.

Data from the sensor suite (e.g., 1152) in combination with map data 1158 can be used to arrive at a global occupancy grid 1190.

In the embodiment shown, a user interface 1114 can be used to enter/receive data that indicates a destination for the robot. Such data can be used to arrive at a goal pose 1192, which can include the position of a target destination. In some embodiments, such a user interface data can be used in conjunction with map data 1158 to arrive at a goal pose 1192.

A given robot pose 1188, goal pose 1192 and global occupancy grid 1190 can be used by a global planner 1194 to generate a global plan (distance map) 1160. In some embodiments, map data can be used with a global occupancy grid that integrates known positions of objects in the mapped area, and in conjunction with robot pose input and the goal pose, a robot global plan 1160 for navigation can be generated. The global plan 1160 can be reduced to a distance map.

Referring still to FIG. 11, a local planner 1196 can combine a global plan 1160 with integrated data of local object positions from the local occupancy grid 1156 and the robot pose 1188. With such data, a local planner 1196 can adjust the local plan to avoid or go around blockages or obstructions in the robot path. Local sensing and re-orientation of the robot (twists) 1158 can verify local paths, and provide control input to the wheels (1198) for partial or full rotation of the robot, or backward or forward movement that avoids objects or people while traveling to a desired destination.

It will be apparent to those skilled in the art that various modifications and variations can be made without departing from the spirit or scope of the invention. Thus, it is intended that the disclosed embodiments cover modifications and variations that come within the scope of the claims that eventually issue in a patent(s) originating from this application and their equivalents. In particular, it is explicitly contemplated that any part or whole of any two or more of the embodiments and their modifications described above can be combined in whole or in part. It is also understood that other embodiments of this invention may be practiced in the absence of an element/step not specifically disclosed herein.

The invention claimed is:

1. A mobile robot, comprising:
a generally cylindrical body between 0.5 and 2 meters high that is no wider than a meter having no structures extending away from the body in a lateral direction by more than one third of the body width;
at least one securable container disposed within the body;
at least one depth sensor mounted within an upper 25% of the body, the depth sensor having a field of view (FOV) of no more than 180° and configured to sense objects proximate the robot; and
a drive mechanism configured to provide linear and rotational movement for the robot.

2. The mobile robot of claim 1, wherein:
the at least one depth sensor is fixedly mounted to the body.

3. The mobile robot of claim 2, wherein:
the at least one depth sensor comprises an emitter configured to emit a signal and an image sensor configured to sense the signal as reflected off objects.

4. The mobile robot of claim 3, wherein:
the emitter is an infrared (IR) light transmitter and the image sensor is an IR video camera.

5. The mobile robot of claim 1, wherein:
the at least one depth sensor is mounted with a downward angle up to one half the FOV from vertical.

6. The mobile robot of claim 1, wherein:
the at least one depth sensor includes a plurality of depth sensors, including
a first depth sensor, and
a second depth sensor mounted proximate the first depth sensor having a FOV orientation different from that of the first depth sensor.

7. The mobile robot of claim 1, wherein:
the robot has a forward direction of motion when navigating; and
the at least one depth sensor is configured to detect objects in a detection area, the detection area including
an area on a traveled surface in the forward direction of motion, and
an area in a space in front of the robot in the forward direction of motion.

8. A mobile robot, comprising:
an elongated body no more than two meters high and no more than one meter wide;
at least one securable container disposed within the body;
at least one depth sensor mounted near or at the top of the body to have a downward field of view (FOV), the at least one depth sensor comprising an image sensor in combination with a beam emitting device; and
a drive mechanism configured to provide linear and rotational movement for the robot.

9. The mobile robot of claim 8, wherein:
the image sensor is configured to sense a beam emitted from the beam emitting device as reflected off objects in a navigated environment.

10. The mobile robot of claim 8, wherein:
the beam emitted by the emitting device comprises light of a non-visible spectrum.

11. The mobile robot of claim 8, wherein:
the at least one depth sensor comprises a plurality of depth sensors including
a first depth sensor, and
a second depth sensor mounted proximate the first depth sensor having a FOV orientation different from that of the first depth sensor.

12. The mobile robot of claim 11, wherein:
the first depth sensor has a forward looking FOV orientation; and
the second depth sensor has FOV orientation in a more downward direction than that of the first depth sensor.

13. The mobile robot of claim 8, further including:
at least one light source; wherein
the at least one depth sensor is configured to sense objects by at least light from the one light source reflecting off objects in a navigated environment.

14. The mobile robot of claim 8, further including:
secondary sensors mounted to the body below the at least one depth sensor and configured to detect the proximity of objects.

15. The mobile robot of claim 8, wherein:
the robot has a forward direction of motion when navigating; and
the at least one depth sensor is configured to detect objects in a detection area, the detection area including
an area on a traveled surface in the forward direction of motion, and
an area in a space in front of the robot in the forward direction of motion.

16. A method, comprising:
navigating a mobile robot through an environment to deliver contents in a securable container, the robot having an elongated body no more than two meters high and no more than one meter wide, including
sensing local objects with at least one depth sensor mounted near or at the top of the body having a field of view less than 180° to generate a local occupancy grid with a processor contained in the robot; and generating control inputs to a drive mechanism of the robot to avoid the sensed local objects as the robot moves to a delivery location; wherein the securable container is disposed within the body.

17. The method of claim 16, wherein:

sensing local objects includes
  emitting a signal to reflect off the local objects, and
  capturing the reflected signal with an image sensor.

18. The method of claim 16, including:

sensing local objects with
  a first depth sensor the first depth sensor having a forward looking field of view (FOV) orientation, and
  a second depth sensor having a FOV orientation in a more downward direction than that of the first depth sensor.

19. The method of claim 16, including:

sensing local objects includes rotating the robot body to enable the at least one depth sensor to determine positions of local objects.

20. The method of claim 16, further including:

generating a localized position for the robot in response to data generated from the at least the one depth sensor and map data.

* * * * *